United States Patent [19]

Helmlinger

[11] Patent Number: 5,730,767
[45] Date of Patent: Mar. 24, 1998

[54] SEALING APPARATUS IN A BELT-TYPE FILTER

[75] Inventor: David V. Helmlinger, Charlotte, N.C.

[73] Assignee: Pneumafil Corporation, Charlotte, N.C.

[21] Appl. No.: 688,513

[22] Filed: Jul. 30, 1996

[51] Int. Cl.⁶ .................................................. B01D 46/022
[52] U.S. Cl. .............................. 55/354; 55/502; 210/400
[58] Field of Search ........................ 55/354, 290, 302, 55/502; 210/400, 483, 398

[56] References Cited

U.S. PATENT DOCUMENTS 2,795,291  6/1957  Pierce .......................................... 55/354
4,394,146  7/1983  Klein ........................................... 55/354
4,725,292  2/1988  Williams .
5,560,835  10/1996  Williams ..................................... 55/290

Primary Examiner—Jay H. Woo
Assistant Examiner—Robert Hopkins
Attorney, Agent, or Firm—Kennedy Covington Lobdell & Hickman, LLP

[57] ABSTRACT

A filter or dust collector which includes a housing for supporting a filter media formed as an endless belt to move along said housing as dirty air passes inwardly through the moving filter media. The surfaces of the housing which support the moving filter media are formed with suction channels, and the filter media is provided with a sealing strip that includes a slack portion of flaccid material that can be drawn partially into the suction channel by the suction therein to enhance the seal along the side edges of the moving filter media.

4 Claims, 4 Drawing Sheets

SEALING APPARATUS IN A BELT-TYPE FILTER

BACKGROUND OF THE INVENTION

This invention relates generally to filters and dust collectors and, more particularly, to apparatus of this general type which includes some arrangement for sealing a filter media in belt form as it moves through its cleaning cycle.

There are many types of filters and dust collectors which include some form of filter media through which transport air or other fluid having dust or other foreign matter entrained therein is passed to deposit the foreign matter on the exposed surface of the filter media and, in industrial and similar heavy-duty applications where the filtered foreign matter collects on the surface of the filter media at a relatively rapid rate, it is desirable to provide the apparatus with some form of automatic cleaning of the filter media so that it can run on a continuous basis.

In some filters and dust collectors designed for industrial use, a suction nozzle is positioned adjacent the surface of the substrate of filter media for removing collected foreign or particulate matter therefrom, and then using the suction to transport the foreign or particulate matter away from the filter for collection and removal. In some filters of this type, a flat stationary filter or a rotating cylindrical filter is used, and a cleaning nozzle is moved across the surface of the filter media to clean the same, all as disclosed, for example, in Williams U.S. Pat. No. 4,725,292. In other similar designs, the filter media is moved past a stationary suction nozzle. More recently, filters or dust collectors have been designed with the filter media having a pleated configuration and formed as an endless belt that is rotated in a generally elliptical path with either a suction nozzle, or a pulse jet air discharge device, or both, located at a curved reach of the filter media to remove foreign matter therefrom, all as disclosed in greater detail in U.S. patent application Ser. No. 08/500,572, filed Jul. 11, 1995, now U.S. Pat. No. 5,560,835 and its continuation-in-part, U.S. patent application Ser. No.08/690,599, filed Jul. 30, 1996. As described in greater detail in such patent applications, the fact that the filter media is moving along a housing which defines the clean air chamber of the filter apparatus can present problems in terms of adequate sealing between the support housing and the moving filter media, whereby dirty or unfiltered air may pass directly into the clean air chamber around the edges of the moving filter media without passing through the filter media.

SUMMARY OF THE INVENTION

The present invention provides an improved arrangement for sealing the side edges of a moving substrate or filter media.

More specifically, the present invention includes a permeable substrate through which a transport fluid having foreign or particular matter entrained therein is passed inwardly therethrough to deposit such matter on the exterior surface of the substrate, and a housing that includes a support frame for supporting the substrate for movement along a predetermined path. The support frame includes support surfaces positioned for supporting the edge portions of the substrate, and these support surfaces are formed with a suction channel extending therealong beneath the substrate edge portions for drawing the substrate edge portions against such support surfaces to form a seal therebetween and to carry away particulate matter that may pass through the seal. The housing also includes at least one drive element for moving the substrate along its predetermined path, and a clean fluid chamber disposed at the interior portion of the substrate from which transport fluid can be removed after it has passed through the substrate. A sealing strip is provided on the substrate, and it includes a portion formed of a flaccid material located adjacent the aforesaid suction channels in the housing, and this flaccid portion is formed with a predetermined slack relative to the substrate to cause the flaccid material to be drawn partially into the suction channel to enhance the seal formed thereat. The flaccid material portion is preferably formed of a close weave fabric, and, preferably, the strip includes a flat portion across which the flaccid portion is superimposed thereon and attached thereto at spaced locations, and the length of the flaccid material portion between such spaced locations is greater than the length of the flat portion between such spaced locations to provide the aforesaid predetermined slack.

DETAILED DESCRIPTION OF THE PREFERRED EMBODIMENT

Looking now in greater detail at the accompanying drawings, a typical dust collector or filter apparatus 10 is illustrated, and it is described in greater detail in the aforesaid U.S. patent application Ser. No.08/690,599.

Figure 1:
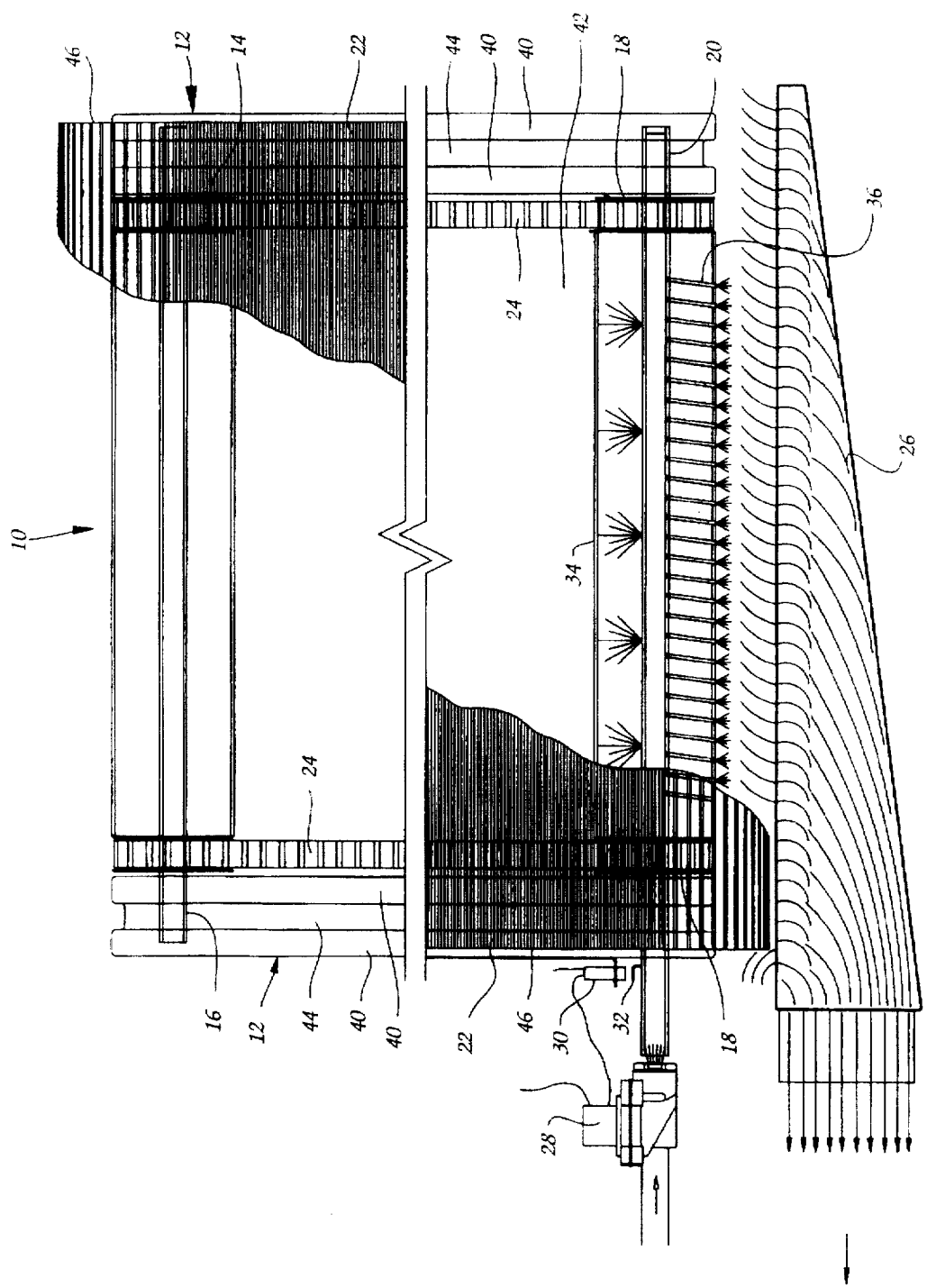
FIG. 1 is a front elevational view of a typical filter apparatus embodying the sealing arrangement of the present invention.
Figure 2:
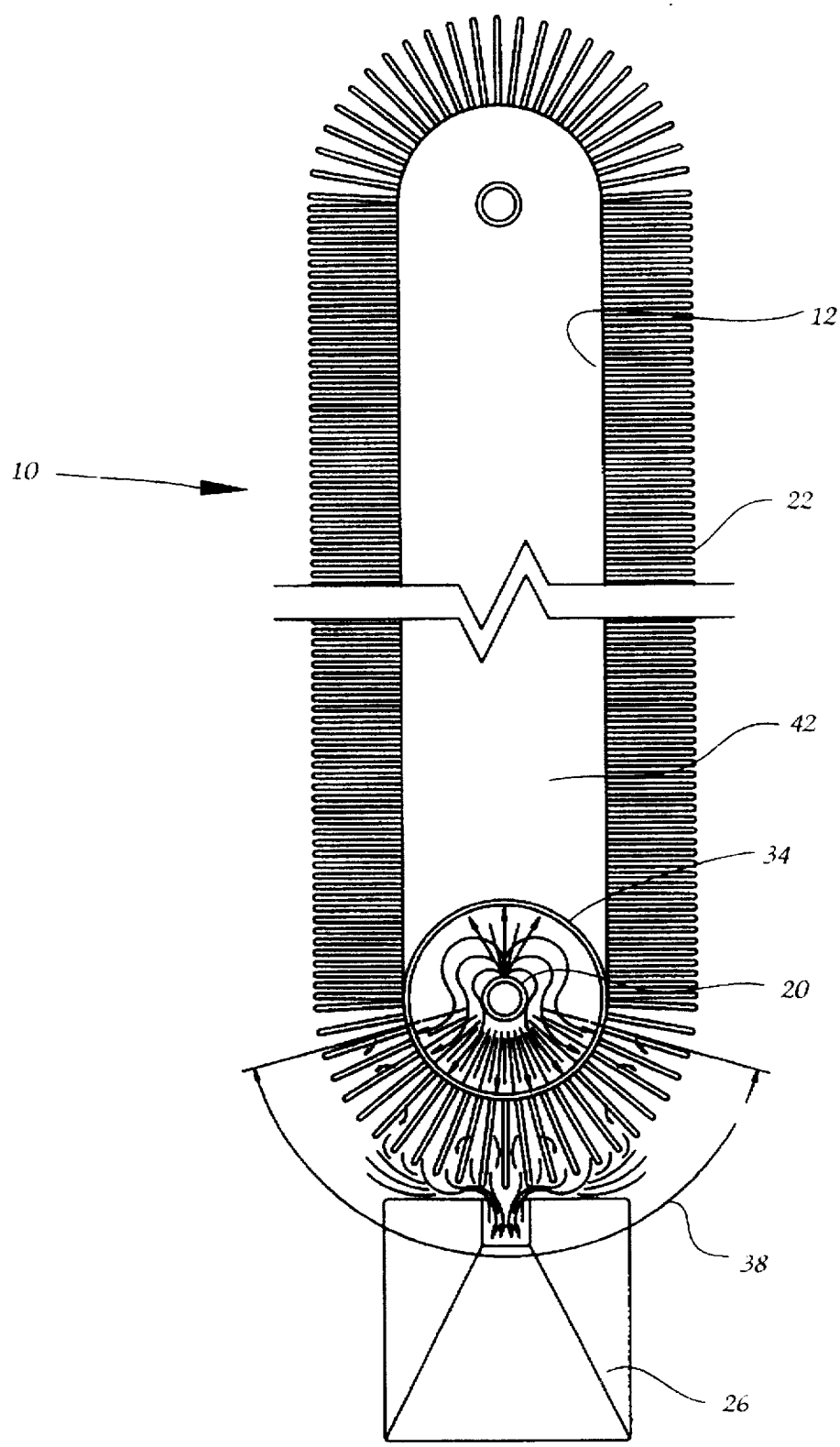
FIG. 2 is a side elevational view of the filter apparatus illustrated in FIG. 1.

The filter apparatus 10 includes a housing 12 which supports a pair of upper pulleys 14 mounted for rotation on a shaft 16 and a pair of lower timing pulleys 18 fixed to an air discharge pipe 20 that is rotated using any convenient and conventional drive motor arrangement (not shown). An endless belt of filter media 22 is formed with continuous pleats 22' and has a pair of spaced timing belts secured thereto, with the timing belts 24 being engageable in driving relation with the upper and lower pulleys 14,18 so that rotation of the lower timing pulleys 18 (which act as driving elements) by the air discharge pipe 20 will result in movement of the filter media 22 in a predetermined path, preferably the generally elliptical path illustrated in FIG. 2.

As described in greater detail in the aforesaid U.S. patent application Ser. No. 08/690,599, a suction nozzle 26 is disposed at the bottom circular reach of the filter media 22 for removing foreign matter or particulate matter collected on the exterior surface of the filter media 22 as it moves past the suction nozzle 26, and a pulse-jet system, the details of which are not important to the present invention, is provided and includes a two-way solenoid operated control valve 28 operated by a sensor 30 and a sensing tab mounted on the rotating air discharge pipe 20 to create a pulse of high pressure air during each revolution of the air discharge pipe 20. This pulse of pressurized air is transmitted through the hollow air discharge pipe 20 to generate a pulse of pressurized cleaning air within a hollow cylinder 34 having slots 36 formed therein across an arcuate portion 38 of the hollow cylinder 34 that is less than 180°, and the pulses of pressurized air generated through the slots 36 pass outwardly through the filter media 22 as it moves through its lower curved reach to remove particulate matter and foreign matter from the exterior surface of the filter media 22.

The housing 12 is formed with flat support surfaces 40 located on each side of the housing 12, and these surfaces extend along the entire vertical height of the filter apparatus 10 on both sides of a clean air chamber 42 located at the interior portion of the housing 12 and the filter media 22, and the support surfaces 40 have curved portions at the upper and lower ends thereof to support the filter media 22 as it moves through its curved reaches. Accordingly, the support surfaces 40 lie adjacent the outermost side edges of the filter media 22 along its entire generally elliptical extent.

Each of the support surfaces 40 is shaped to include a suction channel 44 that extends along the entire length thereof beneath the side edges 46 of the filter media 22, and these suction channels may be connected to the same suction source by suction conduits 44' connected to the suction nozzle 26.

Figure 3:
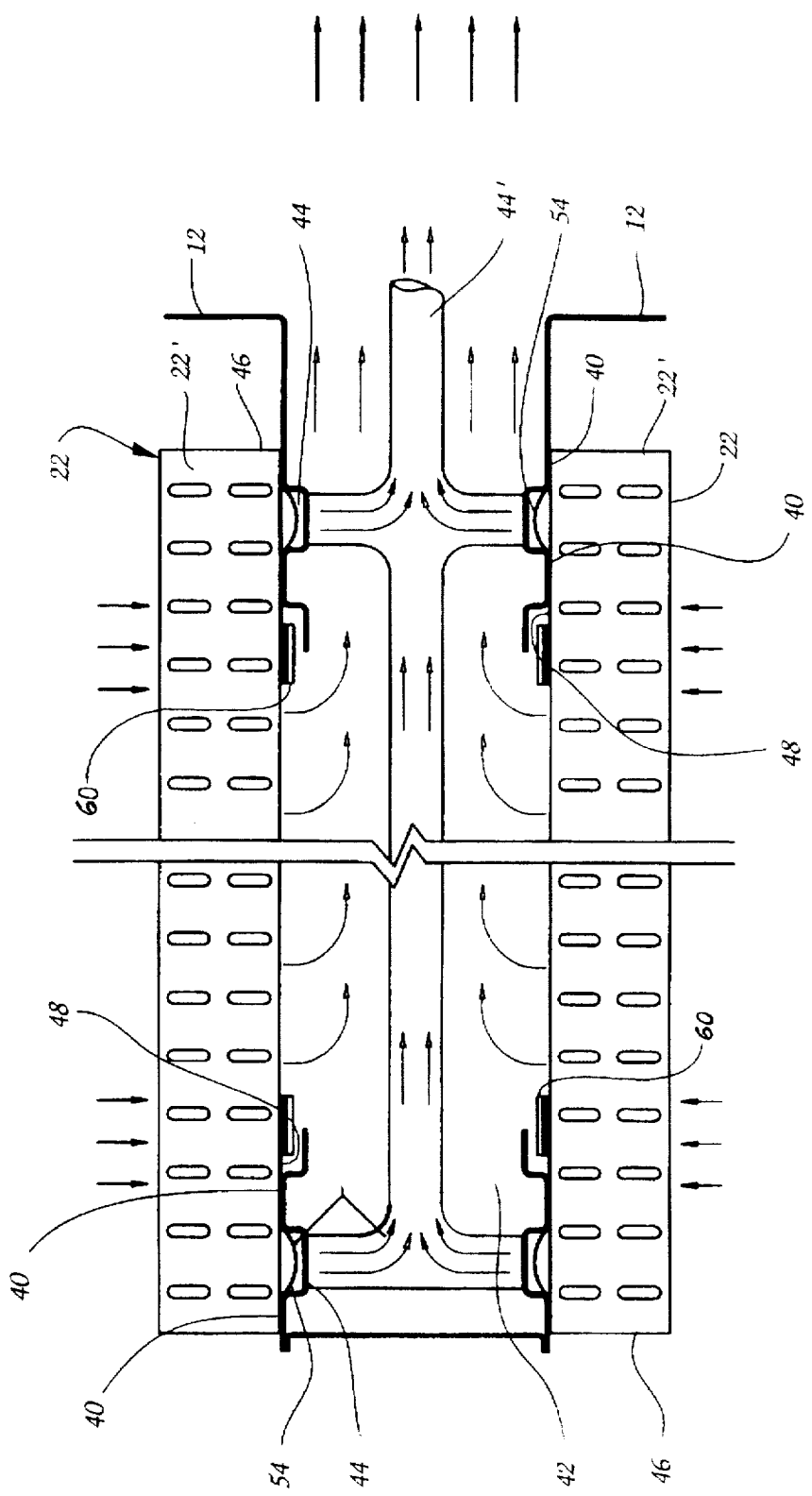
FIG. 3 is a detailed section view illustrating the filter media substrate mounted on its housing support in sealing relation thereto.
Figure 4:
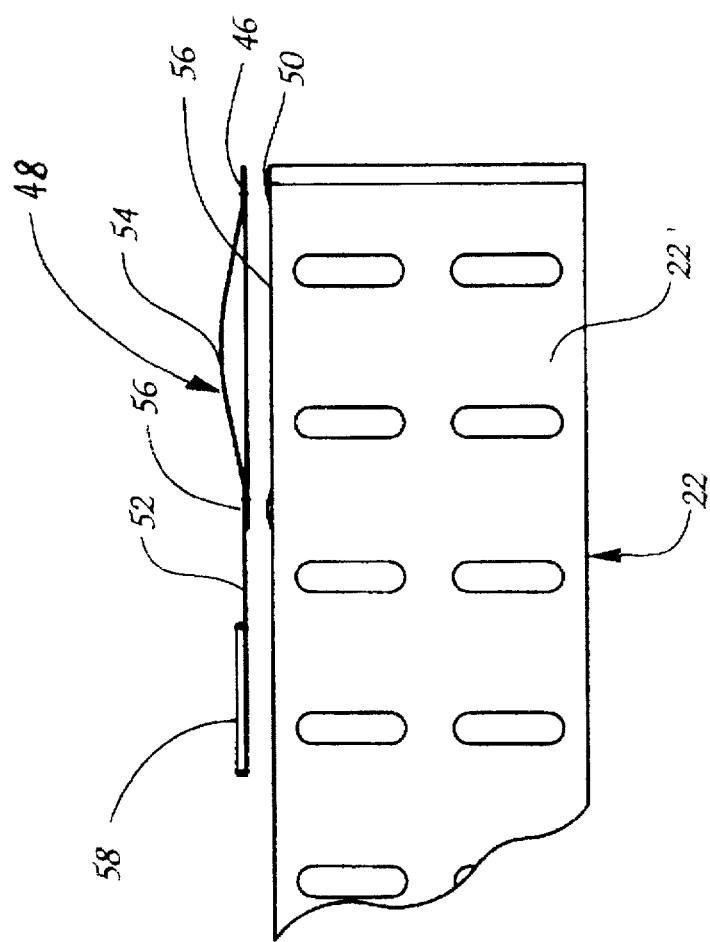
FIG. 4 is a detailed view of the sealing strip attached to the substrate for creating a seal at the suction channels formed in the housing.

In accordance with the present invention, an improved sealing arrangement is provided which includes a sealing and drive strip 48 secured directly to the filter media 22 adjacent each of the side edges 46 thereof, preferably using continuous hot melt beads 50, and these strips 48 extend along the entire continuous edge at both sides of the filter media 22. Each strip 48 is formed of a thin, flexible, imperforate and abrasion resistant material having a relatively low coefficient of friction, preferably a close weave textile fabric, such as a vinyl coated woven polyester fabric, and, as best illustrated in FIG. 4, this material has a flat portion 52 and an overlapping slack portion 54 which is folded back over one end of the flat the flat portion 52 so as to be superimposed thereon and stitched thereto at spaced stitch locations 56. As best seen in FIG. 4, the length of the slack portion 54 between the two stitched portions 56 is greater than the corresponding length of the flat portion 52 between such stitched portions 56, whereby the slack portion is capable of ballooning away from the flat portion 52 in a manner to be described presently. The other end of each flat portion 52 has a continuous Velcro "hook" strip 58 sewn to the flat portion 52, and, as best illustrated in FIG. 3, this Velcro strip 58 can be selectively attached to, and detached from, the aforesaid timing belt 24 which has a cooperating Velcro strip 60 formed thereon for engagement with the Velcro strip 58.

The filter media 22 is supported on the housing 12 so that the slack portion 54 of each of the sealing strips 48 is positioned across the upper open end of the suction channels 44 at each side of the housing 12. Accordingly, when a suction is imposed within the channels 44, this suction causes the slack portion 54 of the sealing strip 48 to balloon outwardly from the flat portion 52 and be drawn into the upper end of each suction channel 44 with the outer surfaces of the slack portions 54 engaging the curved upper edges of the suction channels 44 over a substantial area of contact (see FIG. 3) that provides a very effective seal between the moving filter media 22 and the stationary support surfaces 40 of the housing 12 to prevent dirty transport air from seeping into the clean air chamber 42 at the side edges of the moving filter media 22, and, if any dirty transport air should pass through this seal, it will be carried away by the suction in the suction channel 44.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A self-cleaning filter for use in removing particulate matter from a transport fluid, said filter comprising:

(a) a permeable substrate through which the transport fluid can pass inwardly therethrough and deposit the particulate matter on the exterior surface of said substrate, said substrate including edge portions extending along the side edges thereof; and (b) a housing that includes:

(i) a support frame for supporting said substrate for movement along a predetermined path, said support frame including support surfaces positioned for supporting said edge portions of said substrate, said support surfaces being formed with a suction channel extending therealong beneath said substrate edge portions for drawing said substrate edge portions against said support surfaces to form a seal therebetween and to carry away any particulate matter that may pass through such seal;

(ii) at least one drive element for moving said substrate along said predetermined path; and (iii) a clean fluid chamber disposed at the interior portion of said substrate from which the transport fluid can be removed after it has passed through said substrate; and (c) a sealing strip on said substrate that includes a portion formed of a flaccid material located adjacent said suction channel, said flaccid material portion being formed with a predetermined slack relative to said substrate to cause said flaccid material to be drawn partially into said suction channels to enhance said seal formed thereat.

2. A self-cleaning filter as defined in claim 1, wherein said flaccid material portion is formed of a close weave fabric.

3. A self-cleaning filter as defined in claim 1, wherein said strip includes a flat portion, wherein said flaccid material portion is superimposed on said flat portion and is attached thereto at spaced locations, and wherein the length of said flaccid material portion between said spaced locations is greater than the length of said flat portion between said spaced locations.

4. A self-cleaning filter as defined in claim 1, wherein said strip has a timing belt attached thereto, and wherein said drive element includes a timing pulley in driving relation to said timing belt.

* * * * *